(12) United States Patent
Clarke

(10) Patent No.: US 9,766,600 B2
(45) Date of Patent: Sep. 19, 2017

(54) MANAGEMENT SYSTEM FOR REFRIGERATED CONTAINERS

(75) Inventor: Ross Colin Clarke, The Hague (NL)

(73) Assignee: APM TERMINALS MANAGEMENT B.V., The Hague (NL)

( * ) Notice: Subject to any disclaimer, the term of this patent is extended or adjusted under 35 U.S.C. 154(b) by 778 days.

(21) Appl. No.: 14/239,242

(22) PCT Filed: Aug. 7, 2012

(86) PCT No.: PCT/EP2012/065457
§ 371 (c)(1),
(2), (4) Date: Jul. 23, 2014

(87) PCT Pub. No.: WO2013/023962
PCT Pub. Date: Feb. 21, 2013

(65) Prior Publication Data
US 2014/0343741 A1    Nov. 20, 2014

Related U.S. Application Data

(60) Provisional application No. 61/524,580, filed on Aug. 17, 2011.

(30) Foreign Application Priority Data

Aug. 17, 2011    (DK) ................ 2011 70452

(51) Int. Cl.
*G05D 11/16*    (2006.01)
*G05B 13/02*    (2006.01)
(Continued)

(52) U.S. Cl.
CPC ............ *G05B 13/02* (2013.01); *F25D 11/003* (2013.01); *G06Q 10/00* (2013.01)

(58) Field of Classification Search
CPC ........ G05B 13/02; F25D 11/003; G06Q 10/00
(Continued)

(56) References Cited

U.S. PATENT DOCUMENTS 885,564 A    4/1908   Barker
4,003,728 A    1/1977   Rath
(Continued)

FOREIGN PATENT DOCUMENTS

CN    101053136 A    10/2007
CN    101602429 A    12/2009
(Continued)

OTHER PUBLICATIONS

Kresten Kjaer Sorensen et al., Energy Saving Control-Strategies for Reefer Containers, Presented Nov. 6, 2012, 10 pages.
(Continued)

*Primary Examiner* — Robert Fennema
*Assistant Examiner* — Thomas Stevens
(74) *Attorney, Agent, or Firm* — Brinks Gilson & Lione

(57) ABSTRACT

A system for and a method of supplying electrical power to a plurality of refrigerated containers. The method includes obtaining carriage criteria of one or more refrigerated containers, processing the carriage criteria in a central processor configured to control power supply to a plurality of refrigerated containers, on basis of output of the central processor, managing electrical power supply to the plurality of refrigerated containers.

12 Claims, 3 Drawing Sheets

(51) Int. Cl.
*G06Q 10/00* (2012.01)
*F25D 11/00* (2006.01)
*A47F 3/04* (2006.01)

(58) Field of Classification Search
USPC .......................................... 700/291; 62/250
See application file for complete search history.

(56) References Cited

U.S. PATENT DOCUMENTS

| | | | |
|---|---|---|---|
| 4,885,564 A | 12/1989 | Vercellotti et al. | |
| 4,896,277 A | 1/1990 | Vercellotti | |
| 5,101,643 A * | 4/1992 | Hicke | B60P 3/20 108/51.11 |
| 5,332,547 A * | 7/1994 | Olson | B01D 53/30 422/112 |
| 2002/0099567 A1 | 7/2002 | Joao | |
| 2004/0006439 A1 * | 1/2004 | Hunter | G01D 4/004 702/61 |
| 2004/0081729 A1 * | 4/2004 | Garwood | A23B 4/10 426/235 |
| 2006/0064205 A1 * | 3/2006 | Ying | H01H 9/32 700/286 |
| 2006/0164239 A1 * | 7/2006 | Loda | G06K 19/07327 340/539.22 |
| 2007/0040647 A1 | 2/2007 | Saenz | |
| 2008/0262646 A1 * | 10/2008 | Breed | G01F 23/20 700/226 |
| 2009/0132176 A1 * | 5/2009 | McConnell | G06Q 30/04 702/23 |
| 2009/0299530 A1 | 12/2009 | Burnham et al. | |
| 2011/0193710 A1 | 8/2011 | McIlvain | |
| 2012/0197810 A1 * | 8/2012 | Haarmann | G06Q 10/0832 705/302 |
| 2012/0198866 A1 * | 8/2012 | Zeidner | F25D 11/003 62/89 |
| 2013/0000342 A1 * | 1/2013 | Blasko | B60H 1/00428 62/235.1 |

FOREIGN PATENT DOCUMENTS

| | | |
|---|---|---|
| EP | 2096879 A2 | 9/2009 |
| JP | 2011149685 A | 8/2011 |
| RU | 2015086 C1 | 6/1994 |
| WO | 0070579 A1 | 11/2000 |
| WO | 0215364 A1 | 2/2002 |
| WO | 2006049356 A1 | 5/2006 |
| WO | 2011094099 A1 | 8/2011 |

OTHER PUBLICATIONS

International Search Report for PCT:EP2012:065457, mailed Oct. 10, 2012.pdf, 6 pages.
Written Opinion for PCT:EP2012:065457, mailed Oct. 10, 2012.
International Report on Patentability for PCT:EP2012:065457, completed Dec. 19, 2013, 2 pages.
Office Action for Chinese Application No. 201280039937.9, Issued May 3, 2016, 17 pages.
Decision to grant for Russian Application No. 2014110054, Issued May 27, 2016, 12 pages.

* cited by examiner

| Container | \multicolumn{2}{|c|}{No Power management} | | | | | | | Peak Power |
|---|---|---|---|---|---|---|---|---|---|

| Container | A | | B | | C | | D | | Peak Power |
|---|---|---|---|---|---|---|---|---|---|
| Time | Temp | ON/OFF | Temp | ON/OFF | Temp | ON/OFF | Temp | ON/OFF | Req. |
| 00:00 | -20,00 | 0,00 | -21,00 | 0,00 | -20,50 | 0,00 | -20,00 | 0,00 | 0,00 |
| 01:00 | -19,50 | 0,00 | -20,48 | 0,00 | -19,48 | 0,00 | -19,50 | 0,00 | 0,00 |
| 02:00 | -19,01 | 0,00 | -19,96 | 0,00 | -18,50 | 0,00 | -19,01 | 0,00 | 0,00 |
| 03:00 | -18,54 | 0,00 | -19,46 | 0,00 | -17,58 | 1,00 | -18,54 | 0,00 | 1,00 |
| 04:00 | -18,07 | 0,00 | -18,98 | 0,00 | -20,50 | 0,00 | -18,07 | 0,00 | 0,00 |
| 05:00 | -17,62 | 1,00 | -18,50 | 0,00 | -19,48 | 0,00 | -17,62 | 1,00 | 2,00 |
| 06:00 | -21,00 | 0,00 | -18,04 | 0,00 | -18,50 | 0,00 | -21,00 | 0,00 | 0,00 |
| 07:00 | -20,48 | 0,00 | -17,59 | 1,00 | -17,58 | 1,00 | -20,48 | 0,00 | 2,00 |
| 08:00 | -19,96 | 0,00 | -20,00 | 0,00 | -20,50 | 0,00 | -19,96 | 0,00 | 0,00 |
| 09:00 | -19,46 | 0,00 | -19,50 | 0,00 | -19,48 | 0,00 | -19,46 | 0,00 | 0,00 |
| 10:00 | -18,98 | 0,00 | -20,00 | 0,00 | -18,50 | 0,00 | -18,98 | 0,00 | 0,00 |
| 11:00 | -18,50 | 0,00 | -19,50 | 0,00 | -17,58 | 1,00 | -18,50 | 0,00 | 1,00 |
| 12:00 | -18,04 | 0,00 | -19,01 | 0,00 | -20,50 | 0,00 | -18,04 | 0,00 | 0,00 |
| 13:00 | -17,59 | 1,00 | -18,54 | 0,00 | -19,48 | 0,00 | -17,59 | 1,00 | 2,00 |
| 14:00 | -20,00 | 0,00 | -18,07 | 0,00 | -18,50 | 0,00 | -20,00 | 0,00 | 0,00 |
| 15:00 | -19,50 | 0,00 | -17,62 | 1,00 | -17,58 | 1,00 | -19,50 | 0,00 | 2,00 |
| 16:00 | -19,01 | 0,00 | -20,00 | 0,00 | -21,00 | 0,00 | -19,01 | 0,00 | 0,00 |
| 17:00 | -18,54 | 0,00 | -19,50 | 0,00 | -19,95 | 0,00 | -18,54 | 0,00 | 0,00 |
| 18:00 | -18,07 | 0,00 | -19,01 | 0,00 | -18,95 | 0,00 | -18,07 | 0,00 | 0,00 |
| 19:00 | -17,62 | 1,00 | -18,54 | 0,00 | -18,00 | 0,00 | -17,62 | 1,00 | 2,00 |
| 20:00 | -20,00 | 0,00 | -18,07 | 0,00 | -17,10 | 1,00 | -20,00 | 0,00 | 1,00 |
| 21:00 | -19,50 | 0,00 | -17,62 | 1,00 | -21,00 | 0,00 | -19,50 | 0,00 | 1,00 |
| 22:00 | -19,01 | 0,00 | -20,50 | 0,00 | -19,95 | 0,00 | -19,01 | 0,00 | 0,00 |
| 23:00 | -18,54 | 0,00 | -19,99 | 0,00 | -18,95 | 0,00 | -18,54 | 0,00 | 0,00 |
| 00:00 | -18,07 | 0,00 | -19,49 | 0,00 | -18,00 | 0,00 | -18,07 | 0,00 | 0,00 |
| 01:00 | -17,62 | 1,00 | -19,00 | 0,00 | -17,10 | 1,00 | -17,62 | 1,00 | 3,00 |
| 02:00 | -20,50 | 0,00 | -18,53 | 0,00 | -20,50 | 0,00 | -20,50 | 0,00 | 0,00 |
| 03:00 | -19,99 | 0,00 | -18,06 | 0,00 | -19,48 | 0,00 | -19,99 | 0,00 | 0,00 |
| 04:00 | -19,49 | 0,00 | -17,61 | 1,00 | -18,50 | 0,00 | -19,49 | 0,00 | 1,00 |
| 05:00 | -19,00 | 0,00 | -20,00 | 0,00 | -17,58 | 1,00 | -19,00 | 0,00 | 1,00 |
| 06:00 | -18,53 | 0,00 | -19,50 | 0,00 | -20,00 | 0,00 | -18,53 | 0,00 | 0,00 |
| 07:00 | -18,06 | 0,00 | -19,01 | 0,00 | -19,00 | 0,00 | -18,06 | 0,00 | 0,00 |
| 08:00 | -17,61 | 1,00 | -18,54 | 0,00 | -18,05 | 0,00 | -17,61 | 1,00 | 2,00 |
| 09:00 | -20,00 | 0,00 | -18,07 | 0,00 | -17,15 | 1,00 | -20,00 | 0,00 | 1,00 |

Fig. 2A

| Power management |||||||||
|---|---|---|---|---|---|---|---|---|
| Container | A || B || C || D || Peak Power |
| Time | Temp | ON / OFF | Temp | ON / OFF | Temp | ON / OFF | Temp | ON / OFF | Req. |
| 00:00 | -20,00 | 0,00 | -21,00 | 0,00 | -20,50 | 0,00 | -20,00 | 0,00 | 0,00 |
| 01:00 | -19,50 | 0,00 | -20,48 | 0,00 | -19,48 | 0,00 | -19,50 | 0,00 | 0,00 |
| 02:00 | -19,01 | 0,00 | -19,96 | 0,00 | -18,50 | 0,00 | -19,01 | 0,00 | 0,00 |
| 03:00 | -18,54 | 0,00 | -19,46 | 0,00 | -17,58 | 1,00 | -18,54 | 0,00 | 1,00 |
| 04:00 | -18,07 | 0,00 | -18,98 | 0,00 | -20,50 | 0,00 | -18,07 | 0,00 | 0,00 |
| 05:00 | -17,62 | 1,00 | -18,50 | 0,00 | -19,48 | 0,00 | -17,62 | 1,00 | 2,00 |
| 06:00 | -21,00 | 0,00 | -18,04 | 0,00 | -18,50 | 0,00 | -21,00 | 0,00 | 0,00 |
| 07:00 | -20,48 | 0,00 | -17,59 | 1,00 | -17,58 | 1,00 | -20,48 | 0,00 | 2,00 |
| 08:00 | -19,96 | 0,00 | -20,00 | 0,00 | -20,50 | 0,00 | -19,96 | 0,00 | 0,00 |
| 09:00 | -19,46 | 0,00 | -19,50 | 0,00 | -19,48 | 0,00 | -19,46 | 0,00 | 0,00 |
| 10:00 | -18,98 | 0,00 | -20,00 | 0,00 | -18,50 | 0,00 | -18,98 | 0,00 | 0,00 |
| 11:00 | -18,50 | 0,00 | -19,50 | 0,00 | -17,58 | 1,00 | -18,50 | 0,00 | 1,00 |
| 12:00 | -18,04 | 0,00 | -19,01 | 0,00 | -20,50 | 0,00 | -18,04 | 0,00 | 0,00 |
| 13:00 | -17,59 | 1,00 | -18,54 | 0,00 | -19,48 | 0,00 | -17,59 | 1,00 | 2,00 |
| 14:00 | -20,00 | 0,00 | -18,07 | 0,00 | -18,50 | 0,00 | -20,00 | 0,00 | 0,00 |
| 15:00 | -19,50 | 0,00 | -17,62 | 1,00 | -17,58 | 1,00 | -19,50 | 0,00 | 2,00 |
| 16:00 | -19,01 | 0,00 | -20,00 | 0,00 | -21,00 | 0,00 | -19,01 | 0,00 | 0,00 |
| 17:00 | -18,54 | 0,00 | -19,50 | 0,00 | -19,95 | 0,00 | -18,54 | 0,00 | 0,00 |
| 18:00 | -18,07 | 0,00 | -19,01 | 0,00 | -18,95 | 0,00 | -18,07 | 0,00 | 0,00 |
| 19:00 | -17,62 | 1,00 | -18,54 | 0,00 | -18,00 | 0,00 | -17,62 | 1,00 | 2,00 |
| 20:00 | -20,00 | 0,00 | -18,07 | 0,00 | -17,10 | 1,00 | -20,00 | 0,00 | 1,00 |
| 21:00 | -19,50 | 0,00 | -17,62 | 1,00 | -21,00 | 0,00 | -19,50 | 0,00 | 1,00 |
| 22:00 | -19,01 | 0,00 | -20,50 | 0,00 | -19,95 | 0,00 | -19,01 | 0,00 | 0,00 |
| 23:00 | -18,54 | 0,00 | -19,99 | 0,00 | -18,95 | 0,00 | -18,54 | 0,00 | 0,00 |
| 00:00 | -18,07 | 0,00 | -19,49 | 0,00 | -18,00 | 1,00 | -18,07 | 0,00 | 1,00 |
| 01:00 | -17,62 | 1,00 | -19,00 | 0,00 | -21,00 | 0,00 | -17,62 | 1,00 | 2,00 |
| 02:00 | -20,50 | 0,00 | -18,53 | 0,00 | -19,95 | 0,00 | -20,50 | 0,00 | 0,00 |
| 03:00 | -19,99 | 0,00 | -18,06 | 0,00 | -18,95 | 0,00 | -19,99 | 0,00 | 0,00 |
| 04:00 | -19,49 | 0,00 | -17,61 | 1,00 | -18,00 | 0,00 | -19,49 | 0,00 | 1,00 |
| 05:00 | -19,00 | 0,00 | -20,00 | 0,00 | -17,10 | 1,00 | -19,00 | 0,00 | 1,00 |
| 06:00 | -18,53 | 0,00 | -19,50 | 0,00 | -20,00 | 0,00 | -18,53 | 0,00 | 0,00 |
| 07:00 | -18,06 | 0,00 | -19,01 | 0,00 | -19,00 | 0,00 | -18,06 | 0,00 | 0,00 |
| 08:00 | -17,61 | 1,00 | -18,54 | 0,00 | -18,05 | 0,00 | -17,61 | 1,00 | 2,00 |
| 09:00 | -20,00 | 0,00 | -18,07 | 0,00 | -17,15 | 1,00 | -20,00 | 0,00 | 1,00 |

Fig. 2B

MANAGEMENT SYSTEM FOR REFRIGERATED CONTAINERS

RELATED APPLICATIONS

This application claims the benefit under 35 U.S.C. §371 of International Application No. PCT/EP2012/065457, having an International Filing Date of Aug. 7, 2012, which claims priority to Danish Application No. PA 2011 70452, filed Aug. 17, 2011, and U.S. Provisional Application No. 61/524,580, filed Aug. 17, 2011, the contents of both of which are incorporated herein by reference in their entirety.

The present invention relates, according to a first aspect, to a method of supplying electrical power to a plurality of refrigerated containers.

In particular, the invention according to the first aspect relates to a method of supplying electrical power, where the power is required for cooling, to a plurality of refrigerated containers stored in a container yard facility. The method includes the steps of:

- obtaining data representing individual carriage criteria including individual predefined temperature set points and individual actual cargo temperatures of each of the plurality of refrigerated containers stored in the container yard facility,
- on basis of the carriage criteria and in a central processor, forecasting resulting peak electrical power requirement of the plurality of refrigerated containers,
- on basis of the resulting peak power requirement forecast, lessen, or time wise shift or move, the forecasted resulting peak power requirement of the plurality of refrigerated containers by individually interrupt and resume power supply to the reefer containers on basis of predefined allowable deviation, possibly within each refrigerated containers predefined set points, from a temperature set point of each the refrigerated containers.

According to a second aspect, the present invention relates to a power management system including a central processor configured to control electrical power supply to a plurality of refrigerated containers.

BACKGROUND

Refrigerated containers, or "reefer containers", are used to transport a vast range of different commodities which are required to be transported under specific conditions.

Cargo shippers typically specify a carriage temperature for their product to be carried under. For example a cargo of frozen tuna may have a carriage temperature set point of −25° C. specified. Allowable deviations from the set-point carriage temperature are normally also specified. The deviations may be in the range of e.g. +/−2.0° C. or even more.

Chilled cargoes, such as fruit, are often required to be carried under more stringent carriage criteria's. For example, chilled cargoes may have a carriage temperature set point of e.g. +1.0° C. specified, with an allowable deviation of only +/−0.5° C.

Even short periods wherein a refrigerated container is left without power may cause the temperature of chilled cargoes to deviate outside the allowable limits, or carriage criteria's, giving rise to potential claims for damage to the cargo.

Some national food safety authorities have requirements as to the maximum period of time that a container may be left without power. For example, when the container is transferred from a terminal stack to a truck for delivery, it may be required that the container is off-power for no more than e.g. 45 minutes regardless of whether the cargo temperature actually is maintained within specified limits.

Some commodities, such as ice cream, are not harmed if the cargo temperature is maintained several degrees lower or higher than the specified carriage temperature, for example −25° C. instead of −20° C., i.e. such cargoes may be specified to be transported under a relatively broad carriage criterion.

U.S. Pat. No. 4,896,277 A discloses a method of mapping addresses of a plurality of refrigerated containers having remote monitoring units (RMUs) connected to a power line carrier based monitoring system which includes a master monitoring unit (MMU). The method adapts to the size of the expected number of containers to be mapped by any mapping command, to reduce the overall time to map either a large or small number of containers.

U.S. Pat. No. 4,885,564 A discloses a power line carrier communication system for monitoring refrigerated containers. The system includes a master monitoring unit and a first power line interface which interchange messages in a first format. The first power line interface translates the first format to a second format suitable for power line environment, and messages in the second format are applied to a power line. Remote monitoring units receive the messages from the power line, and they return messages to the power line containing status data relative to refrigerated containers. The second format includes a message starting preamble having a duration and logic level which is not duplicated by normal operation of the apparatus, enhancing the probability of proper message synchronization and reception over noisy power line environments.

US 2002099567 A discloses an apparatus and method for providing shipment information, including a memory device for storing shipment information, a processor for processing at least one of a request and a prompt to provide shipment information, wherein the processor processes the information contained in the memory device, and further wherein the processor generates a delivery message, wherein the delivery message contains information regarding at least one of a shipment description, contents of a shipment, a description of a shipment's contents, the value of a shipment, an shipment invoice, a shipment packing slip, and a shipment bill, and an output device for at least one of outputting, displaying, and printing, information contained in the delivery message.

US 2007040647 A discloses a unit and system for remote monitoring and controlling of various conditions in a container during cargo transport. The system includes a local wireless or cable (wired) network with a local station and access points positioned in the vicinity of location of containers, a remote central station connected with the Internet and a container-mounted means for monitoring and control of reefer equipment, each of which includes a processor and a transceiver of wireless local communication, a GPS-receiver and a transceiver of cellular communication. The processor is connected to the controller of the reefer equipment, while the transceiver of wireless local communication is made so that the creation of Personal Area Network (PAN) with mobile electronic devices (e.g., Notebook, Pocket PC, PDA) is possible, and establishment of wireless communication with a communication gateway of the said local network is also possible.

BRIEF DESCRIPTION OF THE INVENTION

One object of the present invention is set forth a method of supplying electrical power to a plurality of refrigerated containers stored in a container yard facility in a way leading to reduced and/or controllable peak power consumption.

Reducing and/or controlling peak power consumption is desirable inter alia for the following reasons:

Reduced or controlled peak power consumption allows for optimized operation of means for supplying power. One example hereof is where the refrigerated containers are supplied with power generated at a generator plant including a plurality of generators. In such plants, reduction of peak power demands may obviate a need to start-up (or purchase) additional power generating means.

Reduced peak power consumption allows for, in areas with limited electrical power supply, increasing a container yards capacity for accommodating refrigerated containers.

Controllable peak power consumption allows for, in areas wherein the cost of electrical power varies, shifting peak power consumption into cheaper timeframes.

The above objects are met by implementing and utilizing a method of supplying electrical power to a plurality of refrigerated containers according to the preamble of this specification.

As mentioned in the preamble of this specification, there are certain hard frozen commodities which suffer no harm if maintained several degrees above or below the specified set point carriage temperature, e.g. commodities like ice cream. This flexibility inter alia allows a power supply system to optimize operation of power generating resources e.g. by cooling certain refrigerated containers to a temperature which allows for a relatively long subsequent period off power whereby forecasted peak power demands may be reduced or shifted into a more favourable timeframe.

In addition, the system may be configured for monitoring the actual power consumption and duration of power supply required by refrigerated containers connected to the system. This will allow for the central processor to forecast when there is a likelihood of multiple containers refrigeration compressors all starting within a short period of time.

Without intervention, if the refrigeration compressors for a high number of containers start up simultaneously, or within a short time frame, a high peak power demand is established. The method of supplying power according to the present invention enables the reefer management system to delay start-up of a part of the reefer containers to avoid overlapping start-up power requirements, thus "peak shifting" and reducing peak power demand, whilst maintaining compliance with carriage criteria's of all containers connected to the system.

According to one embodiment, the carriage criteria may be transmitted to the central processor by at least one of the plurality of refrigerated containers.

According to one embodiment, the carriage criteria may be transmitted to the central processor by at least one of the plurality of refrigerated containers at periodical intervals.

The refrigerated container may transmit the carriage criteria to the central power processor or management computer. Temperature of the reefer cargo is transmitted to the processor at regular periodical intervals, e.g. every 5 minutes. The frequency of temperature transmissions may be greater for chilled cargoes.

The method may require the refrigerated containers is fitted with means to store the carriage criteria for the commodity in the container. Many of today's refrigerated containers are already fitted with this capability.

According to one embodiment, the method according to the present invention may further include a step of overruling one or more refrigerated containers temperature set point such that one or more of the containers deliberately may be maintained at an offset point temperature.

According to one embodiment, data representing an internal state of one or more of said refrigerated containers may be transmitted to the central processor by at least one of the plurality of refrigerated containers.

According to one embodiment, the data representing an internal state of one or more of the refrigerated containers include data representing an internal temperature of a refrigerated container.

According to one embodiment, the central processor may be configured to forecast electrical power loads and/or electrical power requirement on basis of refrigeration requirements, i.e. carriage criteria's, of a plurality of refrigerated containers.

According to one embodiment, the central processor may be configured to, on basis of the refrigerated containers carriage criteria, together with data representing an internal temperature of one or more refrigerated containers, forecasting a peak electrical power demand of a plurality of refrigerated containers.

According to one embodiment, the central processor may be configured to, when the a peak electrical power demand exceed a pre-defined threshold, analyse whether or not the carriage criteria of one or more of the refrigerated containers allows for at least one or more of the refrigerated containers being left without electrical power supply for a period of time.

According to one embodiment, the central processor further may be configured to shift peak power demand into a low power demand time frame such that the magnitude of peak power consumption is reduced whilst ensuring that carriage criteria's for a plurality of refrigerated containers are complied with.

An example of application of the above method could be to leave several containers carrying "hard frozen" commodities on power to lower the temperature several degrees below the specified carriage temperature, to enable those containers to later on be left off power, during a forecasted period of peak period of demand.

If the predicted power demand for all refrigerated containers connected to the system will exceed a pre-defined threshold, then the power management computer may be configured to analyse whether or not certain refrigerated containers may be left off power for a period of time to shift the peak power consumption into a lower demand time frame, thus reducing peak power consumption, whilst ensuring that carriage criteria's for all containers are complied with.

According to one embodiment, the central processor may be configured to control one or more electrical power generators on basis of one or more of:
  carriage criteria of one or more refrigerated containers,
  data representing an internal temperature of a refrigerated container.

According to one embodiment, the central processor further may be configured to shut down one or more electrical power generators as a result of reduction of peak electrical power consumption.

According to one embodiment, the central processor may be configured to forecast the rate of temperature increase inside its connected containers on basis of one or more of ambient temperature and internal temperature of one or more refrigerated containers.

According to one embodiment, the central processor may be configured to take into account temperature variations between night and day conditions when forecasting future power demand.

According to one embodiment, the central processor may be configured to monitor internal temperature trends such that the central processor may be able to establish an adaptive mode of operation.

According to a second aspect of the present invention, a power management system including a central processor configured to control electrical power supply to a plurality of refrigerated containers are provided. The system is adapted to execute the method according to any one or more of the appended claims.

BRIEF DESCRIPTION OF THE APPENDED FIGURE AND TABLES

FIG. 2A illustrates a first table, hereinafter Table 1, disclosing peak power requirement without power management according to the present invention.

FIG. 2B illustrates a second table, hereinafter Table 2, disclosing peak power requirement with power management according to the present invention.

DETAILED DESCRIPTION WITH REFERENCE TO THE FIGURES

Figure 1:
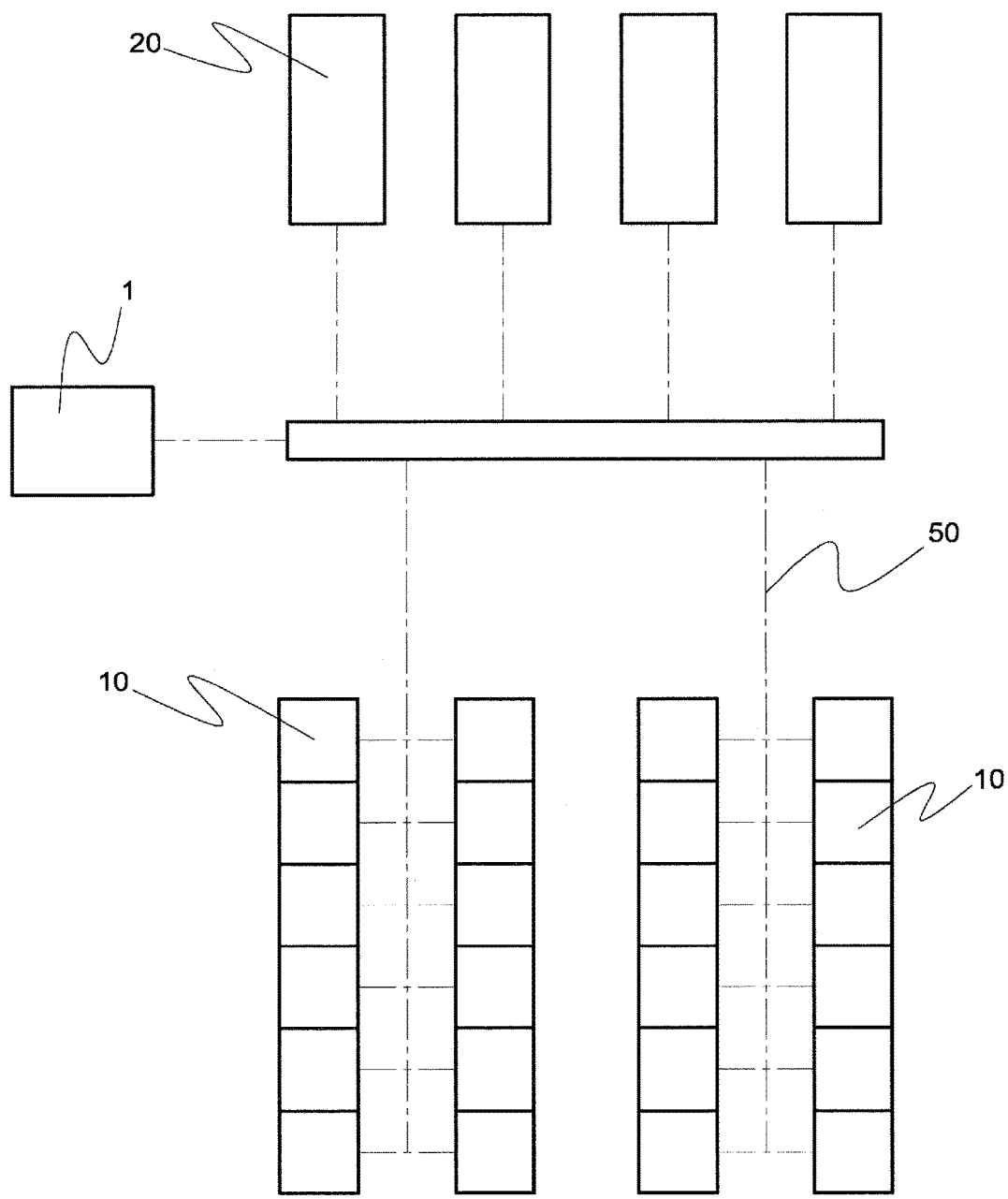
FIG. 1 is a schematical block diagram of a system and method according to the present invention.

Table 1 and 2 provides an illustrative example of the effects of the present invention.

Containers in the example are for simplicity maintained at a temperature of −19° C. (set point), within a range +/−2° C. (deviation)

In the example according to the tables, peak power demand cannot exceed 2 containers on power simultaneously. In practice peak power limitations may be driven by a shortage in total power supply capacity, or high surcharges from electricity suppliers for demand exceeding a certain upper limit.

Reference is made to table 1, if container C is allowed to start up it's compressor at 01:00 hrs (day two), it can be seen that peak demand will be 3 containers on power simultaneously.

As the reefer power management system may be configured to forecast the rate of temperature increase for container C, it will trigger a compressor start-up for container C earlier than would otherwise be required, see table 2.

In the example, by instructing the compressor of container C to start-up "early" at 00:00 hrs, the container temperature will be maintained within the required range, while peak power demand at 01:00 hrs will only be 2 containers which is within the required limit.

Applying the same principal across many containers, a software program running on a computer will be able to monitor temperature trends in connected containers, and by instructing containers to start-up or shut down their reefer compressors "early" or "late", the system will be able to optimize power consumption in a container terminal facility while maintaining reefer cargoes in accordance with the shipper's requirements (cargo criteria's).

In a container terminal the number of refrigerated containers stored in the facility is constantly changing as containers arrive at the terminal prior to being loaded onto ships for export, or onto trucks for delivery to their final destination. A refrigerated container power management system further could interface with a Terminal Operating System (TOS) to receive information about the ETA, and ETD of containers, and integrate that information into the power requirement forecast.

The power management system further could be configured for monitoring ambient temperatures, and take into account the temperature variation between night and day conditions when forecasting future power demand.

Time of day criteria for electricity supply charges would also be a factor programmed into the reefer power management system, to ensure that where possible demand is minimized during higher rated periods of time.

An extension of the time based charging criteria would be to interact dynamically in real time with the electricity supplier's computer system to constantly adjust power demand in accordance changing overall demand requirements.

The reefer power management system described would be useful in any facility storing a number of refrigerated containers; examples of such facilities may be marine container terminals, ships, trains.

The block diagram of FIG. 1 indicates that the connecting cables 50 may carry two-way data as well as the power driving the refrigerating systems of the reefer containers 10. Such data carrying power systems for reefer containers are considered well known to the skilled person and an in-depth exposition of such data carrying power system is considered to lie outside the scope of the present application.

Summarizing, a system for, and a method of, supplying electrical power to a plurality of refrigerated containers is disclosed. The method includes the steps of:
  obtaining carriage criteria of one or more refrigerated containers,
  processing said carriage criteria in a central processor configured to control power supply to a plurality of refrigerated containers,
  on basis of output of said central processor, managing electrical power supply to said plurality of refrigerated containers.

The above exposition prescribes that the refrigerated containers may be left without power supply. This shall be interpreted broadly and is no way meant to exclusively denote removal of power to the unit. The skilled reader will realize that the object of reducing power consumption of a refrigerated container may be achieved e.g. by operating the refrigeration machinery at reduced output or simply by controlling the temperature set points of a plurality of containers via shifting the temperature set point of the unit such that the unit's on-board controller shuts down or adjusts the units refrigeration machinery accordingly. These options, together with other not mentioned options, will have similar effects, and the expression "left without power supply" in this specification therefore equates to shutting down, or reducing the output of, the refrigeration machinery.

This invention may be embodied in several forms without departing from the scope of essential characteristics thereof, the present embodiments are therefore illustrative and not restrictive, since the scope of the invention is defined by the appended claims rather than by the description preceding them, and all changes that fall within meters and bounds of the claims, or equivalence of such meters and bounds thereof are therefore intended to be embodied by the claims.

The invention claimed is:

1. A method of supplying electrical power, where the power is required for cooling, to a plurality of refrigerated containers stored in a facility, said method includes the steps of:

obtaining data representing individual carriage criteria including individual predefined temperature set points and individual actual cargo temperatures of each of said plurality of refrigerated containers stored in said facility, on basis of said carriage criteria and in a central processor, forecasting resulting peak electrical power requirement of said plurality of refrigerated containers, on basis of said resulting peak power requirement forecast, lessen, or time-wise move, said resulting peak power requirement of said plurality of refrigerated containers by individually interrupt and resume power supply to said reefer containers on basis of predefined allowable deviation from a temperature set point of each said refrigerated containers, and in said central processor and on basis of the individual predefined temperature set points and individual actual cargo temperatures of each of said plurality of refrigerated containers stored in said facility that is included in said carriage criteria, forecasting a peak electrical power demand of said plurality of refrigerated containers stored in said facility, wherein said central processor is configured to, when said a peak electrical power demand exceed a pre-defined threshold, analyze whether said carriage criteria of said refrigerated containers allows for at least one or more of said refrigerated containers being left without electrical power supply for a period of time.

2. The method according to claim 1, wherein said carriage criteria are transmitted to said central processor by said plurality of refrigerated containers.

3. The method according to claim 2, wherein said carriage criteria are transmitted by said plurality of refrigerated containers at periodical intervals.

4. The method according to claim 1, wherein said method further includes a step of overruling one or more refrigerated containers' temperature set points such that one or more of said refrigerated containers is maintained at an offset point temperature.

5. The method according to claim 1, wherein said central processor further is configured to shift peak power demand into a low power demand time frame such that the magnitude of peak power consumption is reduced whilst ensuring that carriage criteria's for a plurality of said refrigerated containers are complied with.

6. The method according to claim 1, wherein a central processor is configured to control one or more electrical power generators on basis of one or more of:
carriage criteria of one or more refrigerated containers,
data representing an internal temperature of a refrigerated container.

7. The method according to claim 6, wherein said central processor further is configured to shut down one or more electrical power generators as a result of reduction of peak electrical power consumption.

8. The method according to claim 1, wherein said method further include a step of, in said central processor, forecasting the rate of temperature increase inside its connected refrigerated containers on basis of one or more of:
ambient temperature,
internal temperature change within a given timeframe of one or more of said refrigerated containers.

9. The method according to claim 1, wherein a central processor is configured to take into account temperature variations between night and day conditions when said resulting peak power requirement of said plurality of refrigerated containers is determined.

10. The method according to claim 1, wherein said central processor is configured to take into account temperature variations as a result of weather when said resulting peak power requirement of said plurality of refrigerated containers is determined.

11. The method according to claim 1, wherein said central processor is configured to monitor internal temperature trends of said plurality of refrigerated containers such that said central processor is able to establish an adaptive mode of operation.

12. A power management system including a central processor configured to control electrical power supply to a plurality of refrigerated containers
wherein said system is adapted to execute the method according to claim 1.

* * * * *